United States Patent
Sung (10) Patent No.: US 11,405,067 B2
(45) Date of Patent: Aug. 2, 2022

(54) HOLDING APPARATUS AND METHOD FOR USE WITH PORTABLE ELECTRONIC DEVICES UTILIZING A STRIP APPARATUS

(71) Applicant: Po Ching Sung, Burnaby (CA)

(72) Inventor: Po Ching Sung, Burnaby (CA)

( * ) Notice: Subject to any disclaimer, the term of this patent is extended or adjusted under 35 U.S.C. 154(b) by 0 days.

(21) Appl. No.: 16/975,799

(22) PCT Filed: Oct. 18, 2019

(86) PCT No.: PCT/CA2019/000148
§ 371 (c)(1),
(2) Date: Aug. 26, 2020

(87) PCT Pub. No.: WO2020/077434
PCT Pub. Date: Apr. 23, 2020

(65) Prior Publication Data
US 2021/0250056 A1    Aug. 12, 2021

Related U.S. Application Data (60) Provisional application No. 62/747,549, filed on Oct. 18, 2018.

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0279* (2013.01)

(58) Field of Classification Search
CPC ..... H04M 1/04; H04M 1/0279; G06F 1/1632; H05K 5/0204; H04B 1/3888
See application file for complete search history.

(56) References Cited

U.S. PATENT DOCUMENTS 6,122,162 A * 9/2000 Horie ................... G06F 1/1626
                                                    361/679.55
8,641,217 B2   2/2014 Hirano
(Continued)

FOREIGN PATENT DOCUMENTS

| CN | 102913722 | 2/2013 |
| CN | 105452978 | 3/2016 |

(Continued)

OTHER PUBLICATIONS

International Search Report for PCT/CA2019/000148—Holding Apparatus and Method of Using Same for Use With Portable Electronic Device.

(Continued)

*Primary Examiner* — Pakee Fang
(74) *Attorney, Agent, or Firm* — Voyer Law (57) ABSTRACT

A holding apparatus and method may be used to secure and support a portable electronic device. The apparatus has a base plate that fits along the back surface of a portable electronic device. The base plate has top and bottom base plate surfaces. The apparatus has a strip that fits along the top base plate surface. The apparatus has a frame on the top base plate surface. The frame defines an aperture. The apparatus has pins and recesses that form hinged connections and secure the strip to the base plate. The strip is moveable between engaged and disengaged positions within the aperture.

7 Claims, 10 Drawing Sheets

(56) References Cited

U.S. PATENT DOCUMENTS

| | | |
|---|---|---|
| 8,939,483 B2 | 1/2015 | Kim |
| 8,985,543 B2 | 3/2015 | Chen et al. |
| 9,372,507 B2 | 6/2016 | Dekock et al. |
| 9,660,683 B2 | 5/2017 | Tien |
| 9,671,064 B2 | 6/2017 | Fussy |
| 9,793,941 B1* | 10/2017 | Hirsch .................. H04B 1/385 |
| 9,958,906 B2 | 5/2018 | Ho |
| 10,038,467 B1 | 7/2018 | Fien |
| 10,349,728 B2 | 7/2019 | Yoo |
| 2011/0309117 A1 | 12/2011 | Roberts |
| 2013/0079070 A1* | 3/2013 | Losiewicz ............. H04B 1/385 |
| | | 455/575.8 |
| 2013/0148271 A1* | 6/2013 | Huang ...................... A45F 5/00 |
| | | 361/679.01 |
| 2014/0231276 A1 | 8/2014 | Jung |
| 2016/0192752 A1* | 7/2016 | Lach ................... H04B 1/3888 |
| | | 206/45.2 |
| 2016/0373153 A1 | 12/2016 | Robert |
| 2018/0048342 A1* | 2/2018 | Curcio ................ H04M 1/0202 |
| 2018/0069580 A1* | 3/2018 | Harris-Johnson ...... H04B 1/385 |
| 2018/0294830 A1* | 10/2018 | Osmanski ............ H04B 1/3888 |

FOREIGN PATENT DOCUMENTS

| | | |
|---|---|---|
| DE | 202010005122 | 9/2010 |
| EP | 2999127 | 3/2016 |
| FR | 2996624 | 12/2014 |
| KR | 101125325 | 3/2012 |
| KR | 101267636 | 5/2013 |
| KR | 101318706 | 10/2013 |
| KR | 101629343 | 6/2016 |
| TW | 201245934 | 11/2012 |
| TW | M484286 | 8/2014 |
| TW | M514711 | 12/2015 |

OTHER PUBLICATIONS

Written Opinion for PCT/CA2019/000148—Holding Apparatus and Method of Using Same for Use With Portable Electronic Device.

* cited by examiner

HOLDING APPARATUS AND METHOD FOR USE WITH PORTABLE ELECTRONIC DEVICES UTILIZING A STRIP APPARATUS

FIELD OF INVENTION

The present invention relates to the fields of portable electronic devices and device cases. More specifically, the invention relates to a holding mechanism to be used with portable electronic devices and device holders.

BACKGROUND OF THE INVENTION

Portable electronic devices, such as smart phones and tablets, have existed in our culture for many years now. The technology behind the devices continues to advance at an exponential rate, yet important features of the devices themselves, primarily the body structure, coverings, and cases, have been widely overlooked from a functional standpoint. Regardless of the internal capabilities of a device, most of them must be picked up and handled, or stabilized on a surface, at some point during each and every usage. This is usually true even when employing Bluetooth or head-sets. With the growing number of applications and multi-tasking capabilities on many of the popular devices, handsets and portable electronic devices must be handled, held, and stabilized for longer lengths of time.

This presents the need for a convenient method for a device to be held without involving a handset user's entire hand. Currently, some devices have handles, which requires an entire hand, but some devices do not have a place to hold them. For example, most smart phones on the market today take the shape of a rectangular brick, in order to fit a larger display and virtual keypad on the front face. These devices are bulky and cumbersome, especially when holding for extended lengths of time or trying to remove from a case or pocket.

Some devices have tried to solve the problem by incorporating a slimmer mid portion of the casing or backing within the actual shape of the device. Others have added grips to the sides of the device. Some include lanyards that can be worn around the neck or wrist. Even more have included cases that can be clipped to a belt. Yet all of these models overlook the central problem of keeping the device in a functional position while not commandeering use of the entire hand.

SUMMARY

A holding apparatus and method may be used to secure and support a portable electronic device. The apparatus has a base plate that fits along the back surface of a portable electronic device. The base plate has top and bottom base plate surfaces. The apparatus has a strip that fits along the top base plate surface. The apparatus has a frame on the top base plate surface. The frame defines an aperture. The apparatus has pins and recesses that form hinged connections and secure the strip to the base plate. The strip is moveable between engaged and disengaged positions within the aperture.

DETAILED DESCRIPTION

Figure 28:
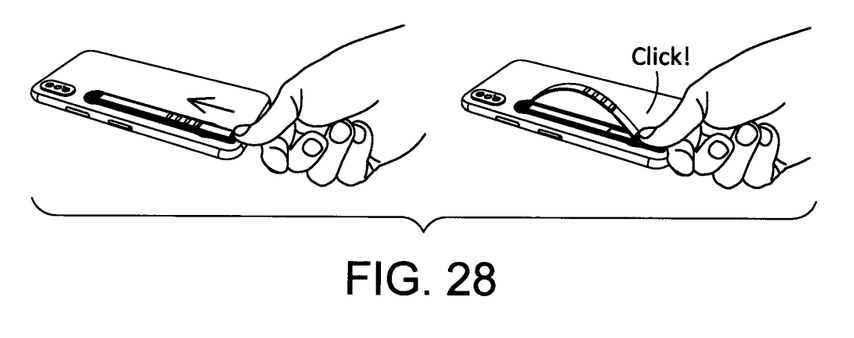
FIG. 28 shows the configuration of the apparatus of FIG. 1 from a disengaged to an engaged configuration.
Figure 29:
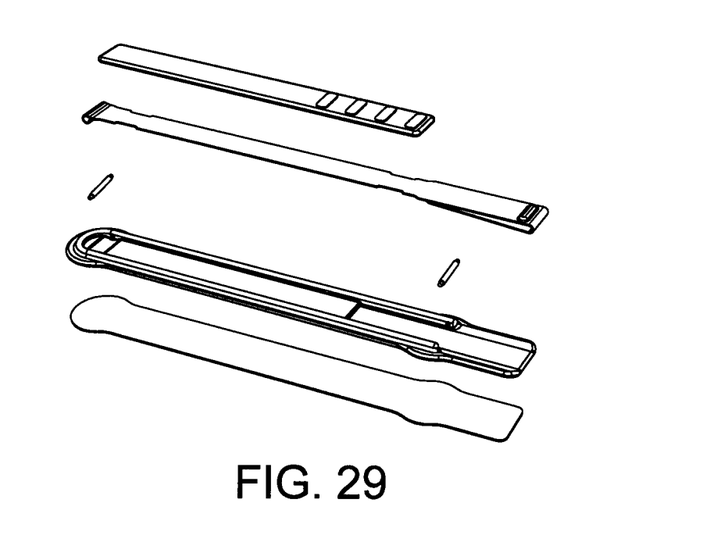
FIG. 29 is an exploded view of the apparatus of FIG. 1 in accordance with an embodiment of the apparatus.
Figure 31:
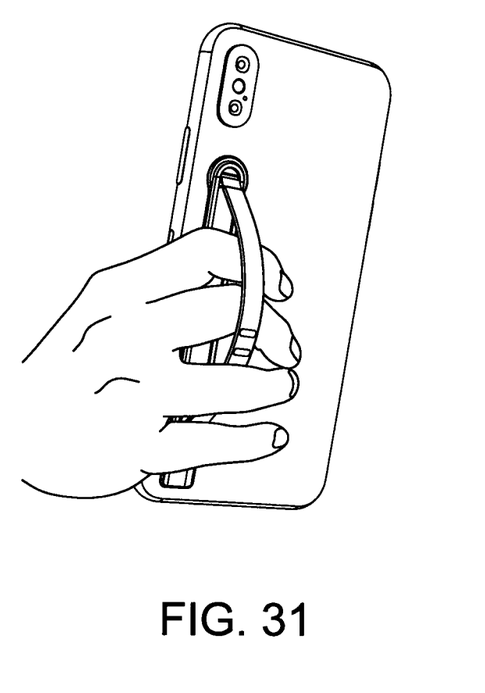
FIG. 31 shows an embodiment of the apparatus of FIG. 1 in use as a holding mechanism with a portable electronic device and in an engaged configuration.

FIGS. 1-29 show embodiments of a holding apparatus 1 for use with a portable electronic device 10. The apparatus 1 is moveable between disengaged and engaged positions, when for example the apparatus is not and is in use, respectively. In an engaged configuration, the apparatus is facilitates holding or stabilizing a portable electronic device in a person's hand as illustrated in FIGS. 28-29, 32 or on a surface, such as a table or desk, as illustrated in FIG. 31.

Figure 1:
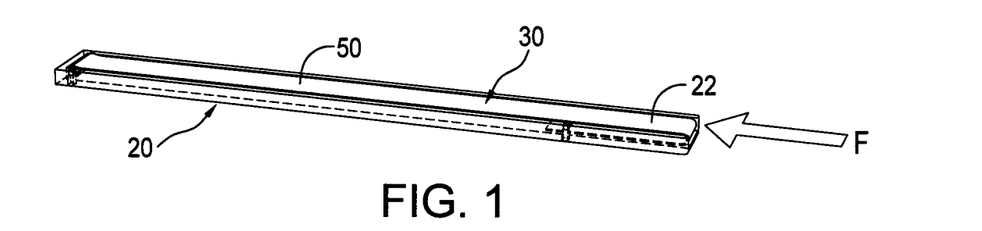
FIG. 1 is a front isometric view of the apparatus in a disengaged configuration in accordance with an embodiment of the apparatus.
Figure 2:
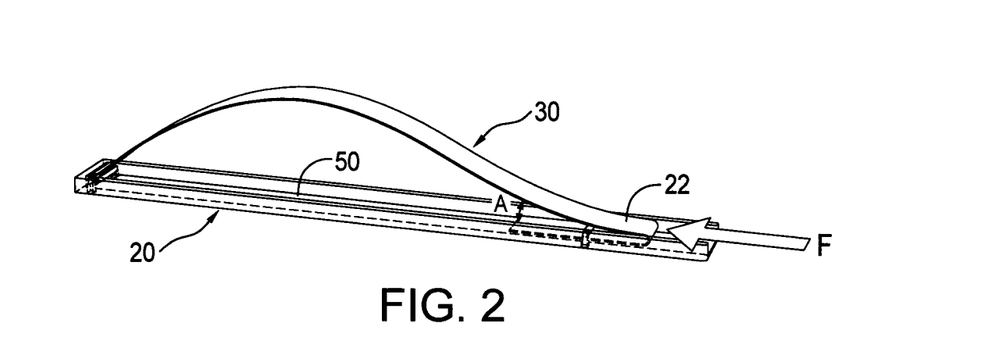
FIG. 2 is a front isometric view of the apparatus between a disengaged and an engaged configuration in accordance with an embodiment of the apparatus.
Figure 3:
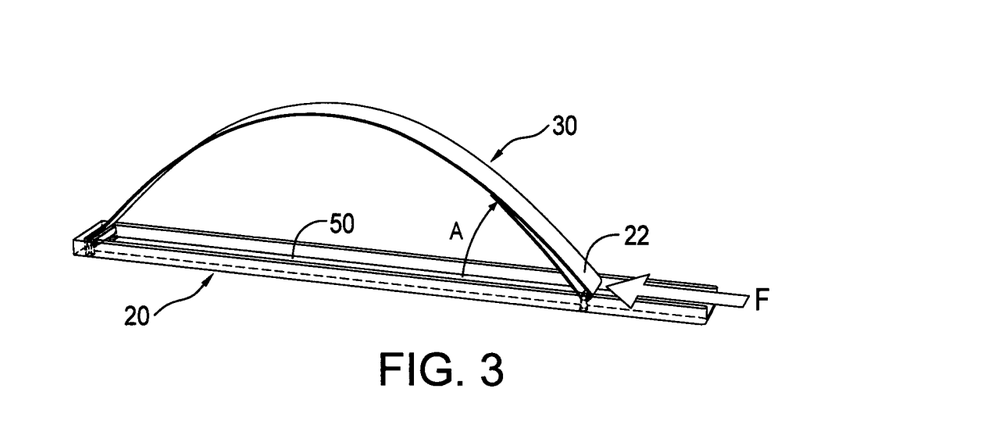
FIG. 3 is a front isometric view of the apparatus in an engaged configuration in accordance with an embodiment of the apparatus.

Referring to FIGS. 1-3, in an embodiment, the holding apparatus 1 has an elongate base plate 20, strip 30, a pin 60 that secures the strip to the base plate 20 at the rear end of the base plate 20, and a locking mechanism 80 that secures the apparatus into the engaged configuration. The base may be affixed to the surface of a portable electronic device, such as a mobile phone.

Figure 6:
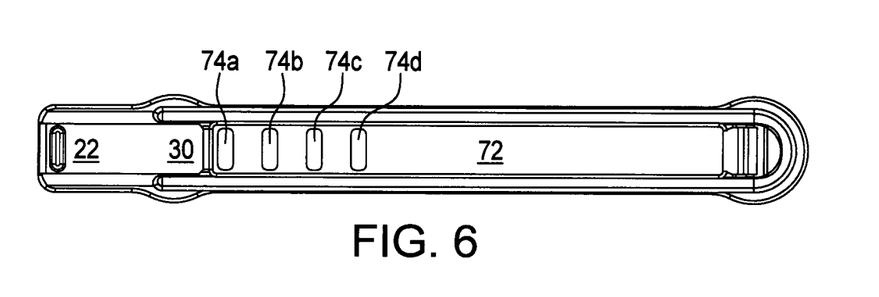
FIG. 6 is a top view of the apparatus in a disengaged configuration in accordance with an embodiment of the apparatus.

In an embodiment, the base plate 20 is an elongate plate made of a solid metallic material. The base plate 20 has a top surface, a bottom surface (not shown), recesses 60, and a frame 50 that extends around the outer perimeter of the top surface of the base plate 20. In an embodiment, the frame 50 has a U-shape, forms a channel or aperture 40 between the two arms of the "U", and is sized to receive and accommodate the strip 30 when the apparatus is not in use. The side members of the U-shaped frame may extend along the entire side of the frame 50 or alternatively along only part of the side of the frame 50, as shown in FIG. 6. Accordingly, the strip 30 is configured to lay on top of and along the base plate within the aperture 40 when the apparatus is not in use (i.e. is in the disengaged configuration). Alternatively, the base plate 20 could be replaced by portable device case, itself, such that the base plate and frame are formed integrally with the case.

In an embodiment, the strip 30 is an elongate, thin, flexible strip made of a resilient material with a high yield strength (e.g. 301 spring tempered stainless steel, Mn steel, spring steel, etc.). Alternatively, it may be made of one continuous piece of stainless steel (e.g. 301 stainless steel). It also has a leading end 22, a tail end 26, a gripping portion 28 between the leading and tail ends, a wing 24 of the front of the leading end, and a folded portion 23 on the front of the leading end 22 between the wing 24 gripping portion 28. The locking mechanism 80 is the combination of the folded portion 23 and wing 24 engaging with a hinge bar or pin 62 to secure the apparatus in the engaged configuration within the aperture 40.

The strip 30 is secured to the base plate 20 via a pin 60 located at the rear end of the base plate 20. In an embodiment, the tail end of the strip is wrapped around the pin 60. The pin 60 is secured to the base plate 20 via recesses 60 within the aperture 40 at the bottom of the U-shaped frame 50 forming a hinged connection between the strip 30 and base plate 20. When the apparatus is moved between the engaged and disengaged positions, the strip 30 rotates around the pin 60.

In an embodiment, the pins 60, 62 (i.e. hinge bars) are affixed to the base plate 20 via recesses 64, 66. Pin 60 and recess 64 are located at the bottom of the U-shaped channel 40 whereas pin. 64 is located near recess The apparatus is moveable between disengaged and engaged configurations, as discussed above. FIG. 1 is a front isometric view of the apparatus in a disengaged configuration, for example, when the apparatus is stowed and not in use. In the disengaged configuration, the components of the apparatus lay flat against one another. The strip 30 is straight and extends and lays within the aperture 40 on the base plate 20. FIGS. 2 and 3 are front isometric views of the apparatus in engaged configurations, for example, when the apparatus is in use. In the engaged configuration, the apparatus functions as a handle or stand to facilitate holding or stabilizing a portable electronic device. The strip 30 is secured into a curved, arched configuration via the locking mechanism 80.

Figure 4:
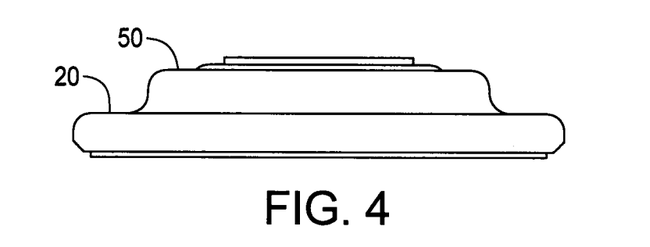
FIG. 4 is a rear side view of the apparatus in accordance with an embodiment of the apparatus.
Figure 5:
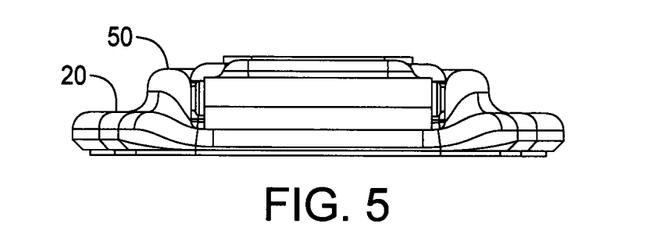
FIG. 5 is a front side view of the apparatus in accordance with an embodiment of the apparatus.

FIGS. 4 and 5 show rear and side views of the apparatus, respectively, in a disengaged configuration in accordance with an embodiment of the apparatus. FIG. 4 shows the rear end of the base plate 20 and the bottom of the frame 50. FIG. 5 shows the front end of the base plate 20, top of the U-shaped frame 50, and folded portion 23 of the strip.

Figure 7:
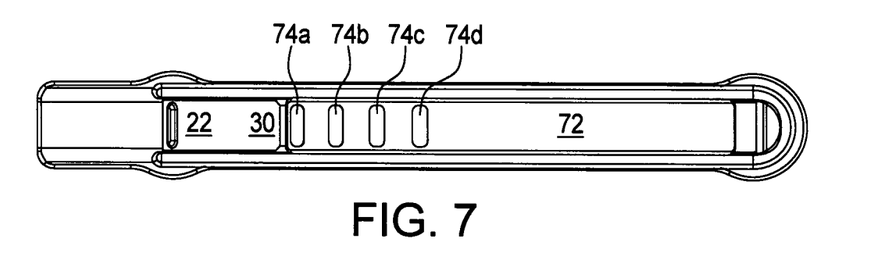
FIG. 7 is a top view of the apparatus in an engaged configuration in accordance with an embodiment of the apparatus.

FIGS. 6 and 7 are top views of the apparatus in disengaged and engaged configurations, respectively, showing the base plate 20, strip 30, frame 50, and pins 60, 62 in accordance with an embodiment of the apparatus. In an embodiment, the frame 50 has a U-shape and the aperture is a channel enclosed by the bottom and sides of the "U". The strip 30 rests snugly within the channel 40 enclosed by a U-shaped frame 50. A pin 62 secures the strip 30 to the base plate 20. In an embodiment, the apparatus has a sleeve 72 covering the gripping portion 28 to facilitate moving the strip 30 between the disengaged and engaged configurations. The gripping portion and/or the sleeve 72 may have ridges 74 to further facilitate moving the strip between the disengaged and engaged configurations. Alternatively, the apparatus does not have a sleeve or ridges, as shown in the embodiment in FIGS. 1-3. The sleeve 72 may be made of silicone. The sleeve 72 has a ridges 74a, 74b, 74c, 74d to facilitate gripping and moving the strip 30 between the disengaged and engaged configurations within the channel 40. In an embodiment, the leading end 22 of the strip 30 may also have a ridge 76 adjacent the folded portion 23 on the leading end 22 of the strip 30 to facilitate gripping and sliding the leading end 22 of the strip 30 between the disengaged and engaged configurations within the channel 40. Referring to FIG. 7, when in an engaged configuration, the strip is moved laterally across the base plate 20 within the aperture 40 until the folded portion 23 engages with the pin 64.

Figure 8:
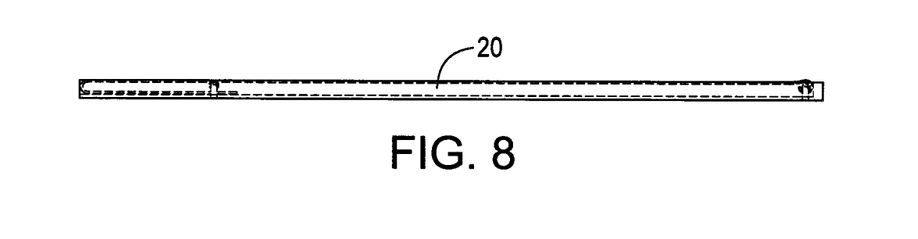
FIG. 8 is a side view of the apparatus in a disengaged configuration in accordance with an embodiment of the apparatus.
Figure 9:
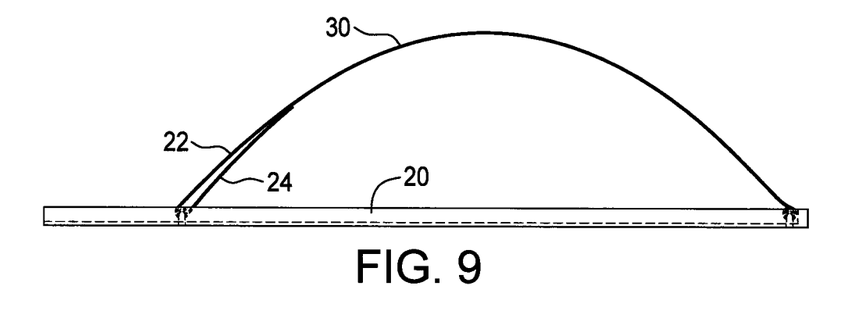
FIG. 9 is a side view of the apparatus in an engaged configuration in accordance with an embodiment of the apparatus.
Figure 10:
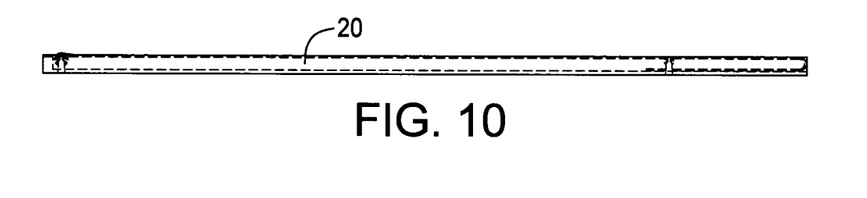
FIG. 10 is an opposite side view of the apparatus in a disengaged configuration in accordance with an embodiment of the apparatus.
Figure 11:
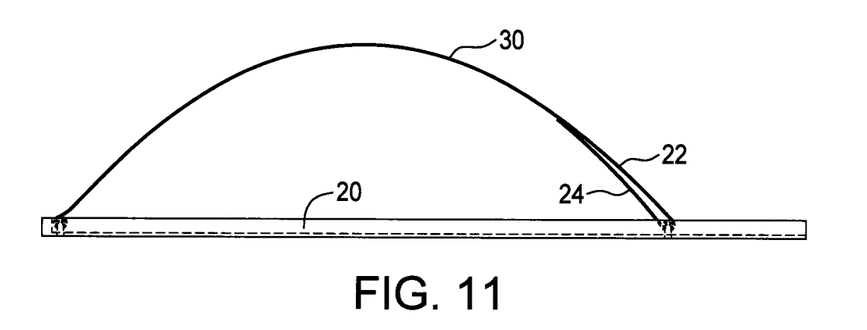
FIG. 11 is an opposite side view of the apparatus in an engaged configuration in accordance with an embodiment of the apparatus.

FIGS. 8-9 are side views of the apparatus in disengaged and engaged configurations, respectively, showing the base plate 20, frame 50, strip 30, folded portion 22, ridge 76 on the leading end 22 of the strip 30, and gripping portion 28 of the strip 30 in accordance with an embodiment of the apparatus. FIGS. 10-11 show opposite side views of the apparatus in FIGS. 8-9, respectively with the showing the base plate 20, frame 50, strip 30, folded portion 22, ridge 76 on the leading end 22 of the strip 30, and gripping portion 28 of the strip 30.

Figure 12:
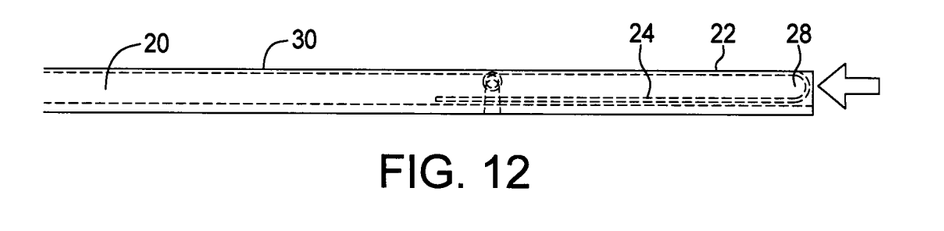
FIG. 12 is a close-up, side view of the front end of the apparatus in a disengaged configuration in accordance with an embodiment of the apparatus.
Figure 13:
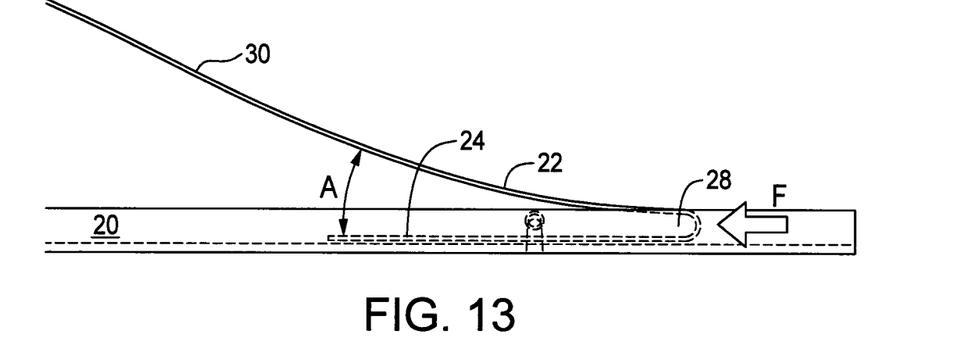
FIG. 13 is a close-up, side view of the front end of the apparatus moving from a disengaged to an engaged configuration in accordance with an embodiment of the apparatus.
Figure 14:
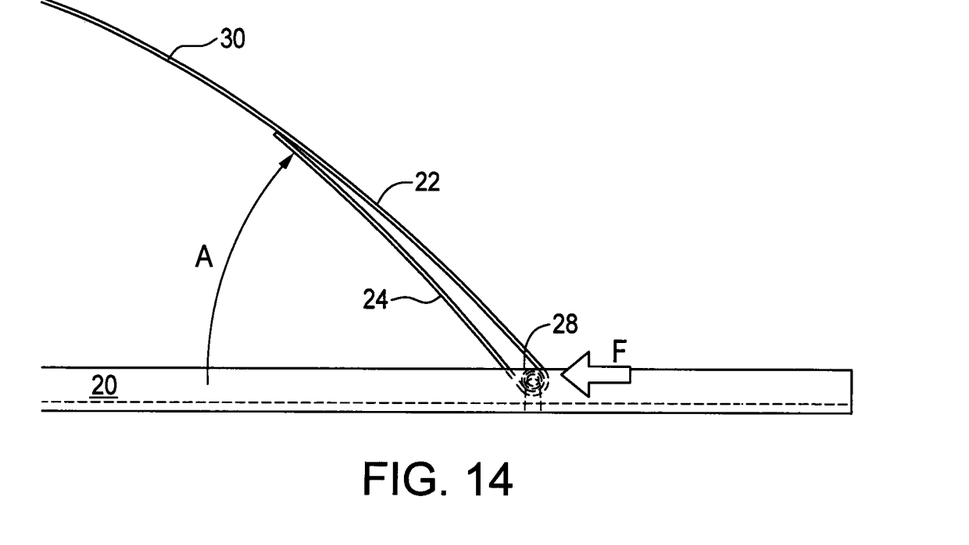
FIG. 14 is a close-up, side view of the front end of the apparatus moving from a disengaged to an engaged configuration in accordance with an embodiment of the apparatus.
Figure 18:
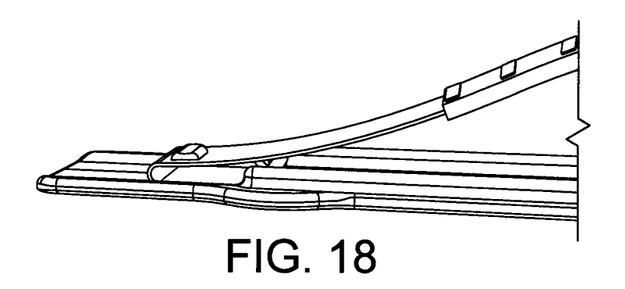
FIG. 18 is a close-up, side isometric view of the apparatus of FIG. 13 in accordance with an embodiment of the apparatus.

FIGS. 12-14 are close-up, side views of the front end of the apparatus moving from a disengaged configuration to an engaged configuration within the channel 40 in accordance with an embodiment of the apparatus. FIG. 18 is a close-up, side isometric view of the apparatus of FIG. 13 in accordance with an embodiment of the apparatus.

In an embodiment the apparatus has a base plate 20, frame 50, strip 30, folded portion 22, ridge 62 to facilitate gripping the strip 30, a sleeve 72, and ridges 74 on the sleeve 72. Referring to FIG. 12, in an embodiment, in the disengaged configuration, the length of the strip 30 and base plate 20 are the same or nearly the same. The strip 30 lays flat against the base plate 30 and the folded portion 22 is flush with the front end of the base plate 20.

In FIG. 12, the apparatus is in a disengaged configuration. The wing is flat against the base plate. To move the apparatus into an engaged configuration, a force (e.g. $F_1$ or $F_2$) applied to the leading end 22 of the strip 30, which pushes the strip in a direction toward the rear of the base plate 20 (i.e. in the direction of the arrow) within the channel 40 in order to engage the folded portion 28 of the strip 30 with the pin 64 and secure the folded portion 28 in place. Referring to FIG. 13, the force F pushes the strip 30 upward and away from the base plate 20 and the wing 24 remains flat against the base plate 20, forming an angle A between the strip 30 and wing 24. The force F and angle A are directly related. As the force F increases and pushes the strip 30 upward away from the wing, the angle A between the strip 30 and base plate 20 increases, until the folded portion abuts the pin 60, as shown in FIG. 14. Referring to FIG. 14, when the folded portion abuts the pin 60, the wing springs back up against the bottom of the strip 30. FIG. 14 shows a side view of the apparatus with the folded portion 22 of the strip 30 engaging with the pin 64 and the wing flat against the bottom of the strip 30, which together lock the strip in place and secure the apparatus in the engaged configuration.

Figure 15:
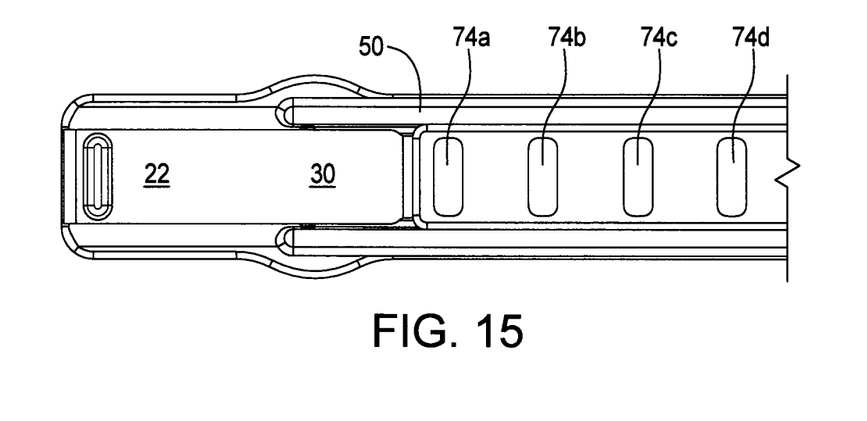
FIG. 15 is a close-up, top view of the front end of the apparatus in a disengaged configuration in accordance with an embodiment of the apparatus.
Figure 16:
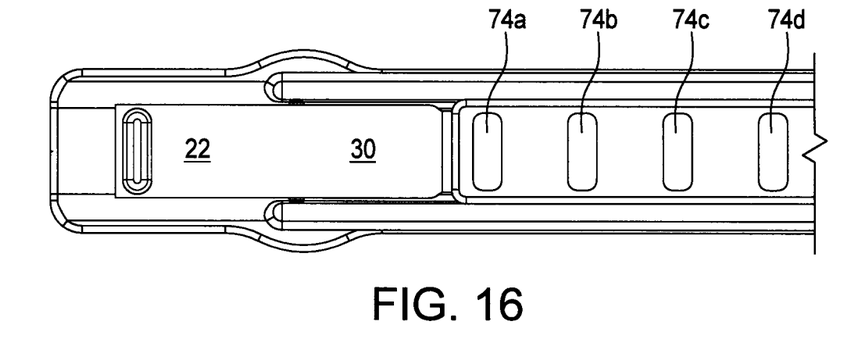
FIG. 16 is a close-up, top view of the front end of the apparatus moving from a disengaged to an engaged configuration in accordance with an embodiment of the apparatus.
Figure 17:
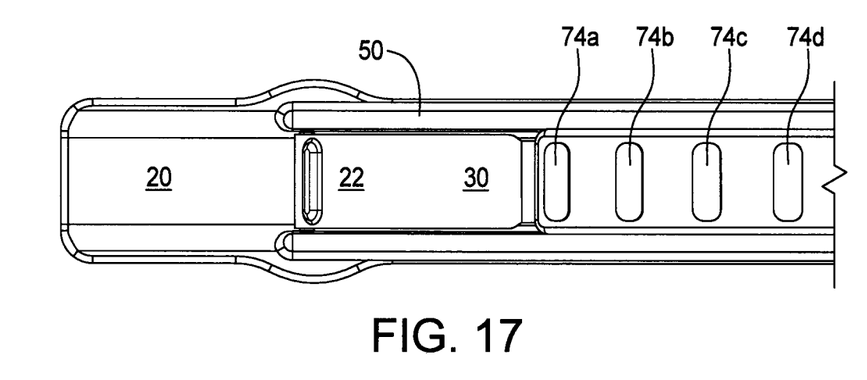
FIG. 17 is a close-up, top view of the front end of the apparatus in an engaged configuration in accordance with an embodiment of the apparatus.

FIGS. 15, 16, and 17 are close-up, top views of the front end of the apparatus showing the base plate 20, pin 64, frame 50, strip 30 with a sleeve 72 and ridges 74a, 74b, 74c, 74d on the gripping portion 28, folded portion 22, and ridge 76 on the leading end 22 of the strip 30 in accordance with an embodiment of the apparatus. FIGS. 15 and 17 show close-up, top views of the front end of the apparatus in disengaged and engaged configurations, respectively. FIG. 16 shows a close-up, top view of the front end of the apparatus moving from a disengaged configuration to an engaged configuration along the base plate 20 and within the channel 40 in accordance with an embodiment of the apparatus. In the engaged configuration (FIGS. 17 and 18), the strip is locked into place by the engagement of the folded portion 22 around the pin 64.

Figure 19:
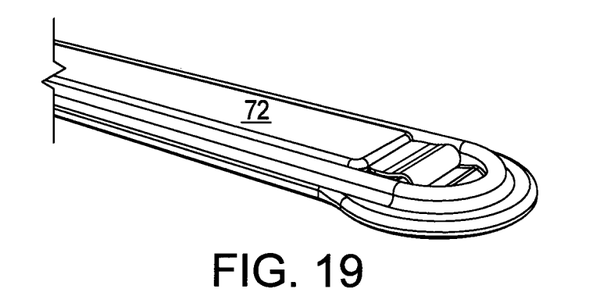
FIG. 19 is a close-up, isometric view of the tail end of the apparatus of FIG. 1 in a disengaged configuration in accordance with an embodiment of the apparatus.
Figure 20:
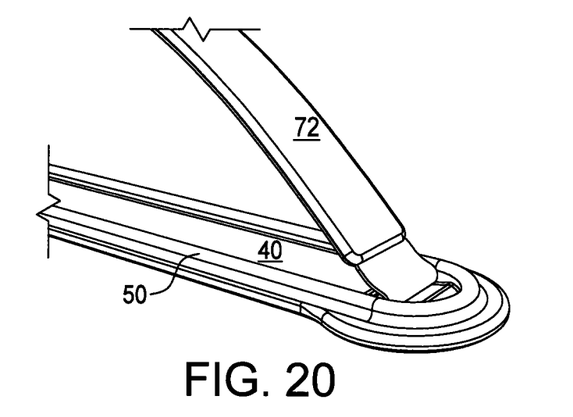
FIG. 20 is a close-up, isometric view of the tail end of the apparatus of FIG. 2 in an engaged configuration in accordance with an embodiment of the apparatus.

FIGS. 19 and 20 are close-up, isometric views of the tail end 26 of the apparatus of FIG. 1 in disengaged and engaged configurations in accordance with an embodiment of the apparatus. In an embodiment, a sleeve 72 surrounds the strip 30 and the tail end of the strip 30 is wrapped around the pin 60 which secured to the base plate 20 via recesses (not shown) in the U-shaped frame 50 at the bottom of the U-shaped channel 40. FIGS. 19 and 20 also show how the strip 30 rotates around the pin 60 as the apparatus is moved between the engaged and disengaged positions.

Figure 21:
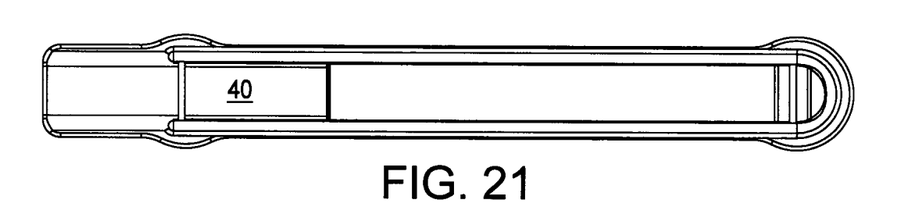
FIG. 21 is a top view of the base plate of the apparatus of FIG. 1 in accordance with an embodiment of the apparatus.
Figure 22:
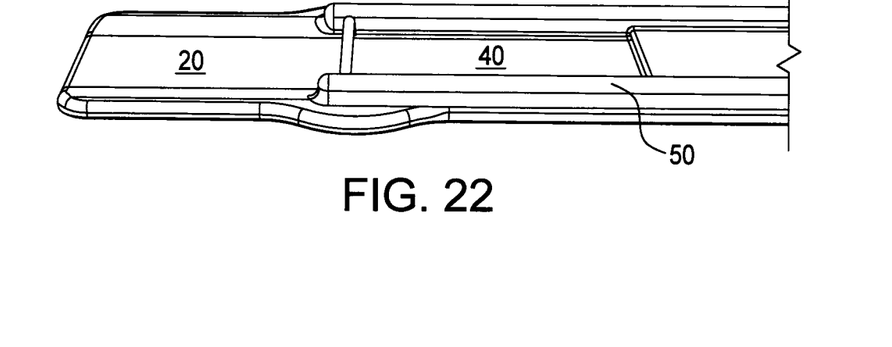
FIG. 22 is a close-up, side isometric view of the front end of the base plate of FIG. 22 in accordance with an embodiment of the apparatus.
Figure 23:
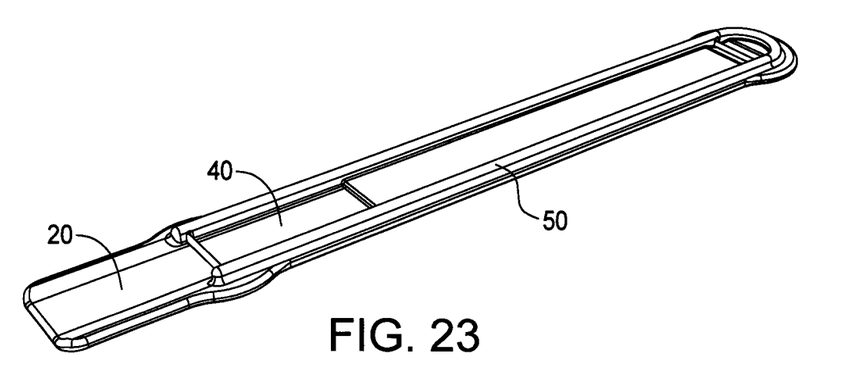
FIG. 23 is a isometric view of the base plate of the apparatus of FIG. 1 in accordance with an embodiment of the apparatus.
Figure 24:
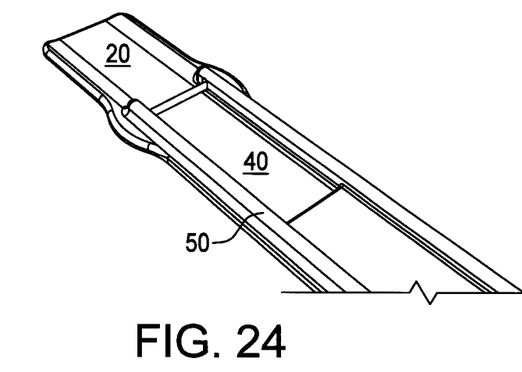
FIG. 24 is a rear isometric view of the front end of the base plate of the apparatus of FIG. 1 in accordance with an embodiment of the apparatus.
Figure 25:
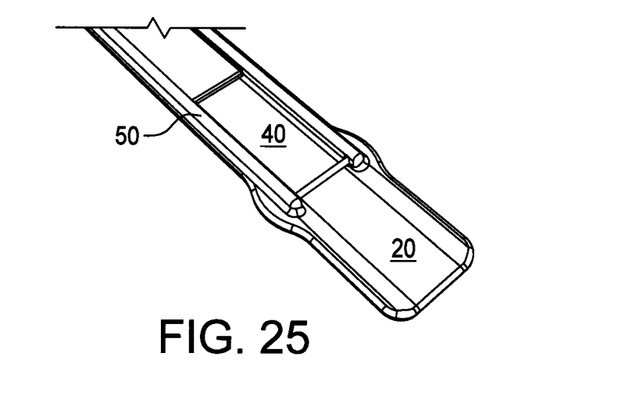
FIG. 25 is a front isometric view of the front end of the base plate of the apparatus of FIG. 1 in accordance with an embodiment of the apparatus.

FIGS. 21-25 show the base plate 20 of the apparatus of FIG. 1 in accordance with an embodiment of the apparatus. FIGS. 21 and 23 are top and isometric views, respectively, of the base plate 20 showing the pins 60, 62, incline 68, frame 50, and channel 40 formed by the frame 50. FIG. 22 is a close-up, side isometric view of the front end of the base plate 20 of FIG. 21, showing the pin 60, recesses 64, incline 68, and channel 40. FIGS. 24 and 25 are respective rear and front isometric views of the front end of the base plate of FIG. 22.

Figure 26:
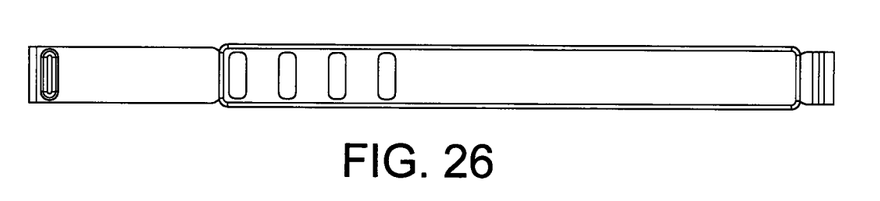
FIG. 26 is a top view of the strip of the apparatus of FIG. 1 in accordance with an embodiment of the apparatus.
Figure 27:
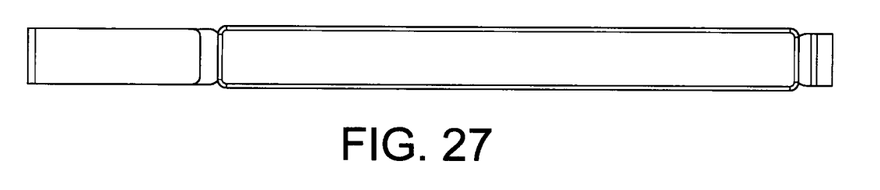
FIG. 27 is a bottom view of the strip of the apparatus of FIG. 1 in accordance with an embodiment of the apparatus.

FIGS. 26 and 27 are top and bottom views, respectively, of the strip 30 of the apparatus of FIG. 1 in accordance with an embodiment of the apparatus. FIG. 26 shows ridges 74 on the strip 30.

FIG. 28 shows the configuration of the apparatus of FIG. 1 from a disengaged to an engaged configuration by sliding the strip 30 within the channel 40 until the folding portion 22 engages with the pin 62.

FIG. 29 is an exploded isometric view of the apparatus of FIG. 1 in accordance with an embodiment of the apparatus. In an embodiment, the apparatus has a base plate 20 for fixing the position of the pins 60, 62 and housing the strip 30, an adhesive layer (e.g. tape) which attaches the base plate to a portable electronic device (not shown), a base plate 20 with a U-shaped frame 50 on top of it which defines a channel 40 between the side members of the U-shaped frame, pins 60, 62 that fit within recesses 64, 66 formed within the base plate 20, a strip 30, and sleeve 72 with ridges 74 to facilitate gripping and moving the strip between the disengaged and engaged configurations. The sleeve may be made of a soft protective material such as silicone, rubber, fabric, etc.).

Figure 30:
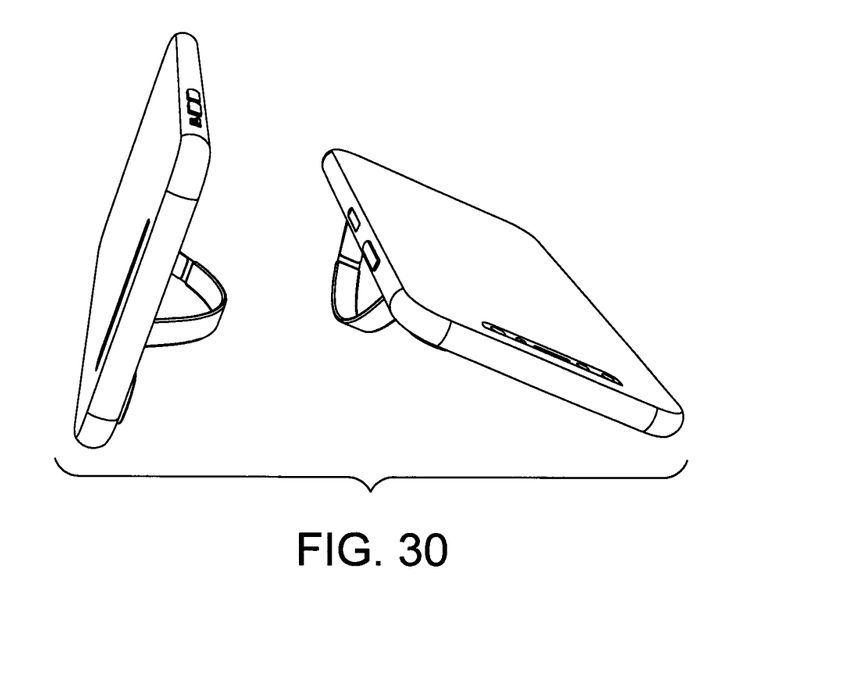
FIG. 30 shows an embodiment of the apparatus of FIG. 1 in use as a stand with a portable electronic device and in an engaged configuration.

FIGS. 30 and 31 show another embodiment of the apparatus of FIG. 1 in an engaged configuration and in use as a stand and a holding mechanism, respectively, for use with a portable electronic device. When used as a stand, the apparatus stabilizes the portable electronic device and allows a user to use the device hands-free. When used as a holder, the apparatus stabilizes the device by allowing the user to grip the device more easily and mitigate the risk of the device falling out of the user's hand.

The invention claimed is:

1. A holding apparatus for use with a portable electronic device, the apparatus comprising:
    a base plate comprising top and bottom base plate surfaces;
    a frame on the top base plate surface, the frame defining a strip aperture a strip that fits along the top base plate surface comprising a tail end that is fixed and hinged to the top base plate surface a leading end comprising a folded portion and a wing;
    a pin for securing the strip in an engaged configuration;
    a pin for securing the strip to the base plate; and
    a plurality of recesses for receiving the pin;
    wherein the strip is moveable between engaged and disengaged configurations within the strip aperture and in the engaged position, the folded portion and the wing of the leading end hooks onto the pin to secure the strip in the engaged position.

2. The apparatus of claim 1, wherein the strip further comprises
    a gripping portion between the leading end and the tail end.

3. The apparatus of claim 2, wherein the gripping portion comprises ridges to facilitate gripping of the strip.

4. The apparatus of claim 2, wherein the pin is secured to the tail end of the strip.

5. The apparatus of claim 1, wherein the strip comprises a flexible, resilient material.

6. The apparatus of claim 1, wherein the frame comprises a U-shape.

7. A method of supporting a portable electronic device, the method comprising:

Providing the apparatus of claim 1;

Affixing the apparatus to the portable electronic device; and

Moving the apparatus to an engaged position by sliding the strip along the channel until the locking mechanism engages with the pin.

\* \* \* \* \*